C. H. SMITH.
COUPLING FOR LIGHTNING RODS.

No. 192,718. Patented July 3, 1877.

WITNESSES
E. H. Bates
Walter C. Mass

INVENTOR
Charles H. Smith,
Chipman & Fosmire
ATTORNEYS

UNITED STATES PATENT OFFICE.

CHARLES H. SMITH, OF CHICAGO, ILLINOIS.

IMPROVEMENT IN COUPLINGS FOR LIGHTNING-RODS.

Specification forming part of Letters Patent No. 192,718, dated July 3, 1877; application filed December 8, 1875.

*To all whom it may concern:*

Be it known that I, CHARLES H. SMITH, of Chicago, in the county of Cook and State of Illinois, have invented a new and valuable Improvement in Couplings for Lightning-Rods; and I do hereby declare that the following is a full, clear, and exact description of the construction and operation of the same, reference being had to the annexed drawings, making a part of this specification, and to the letters and figures of reference marked thereon.

Figure 1:
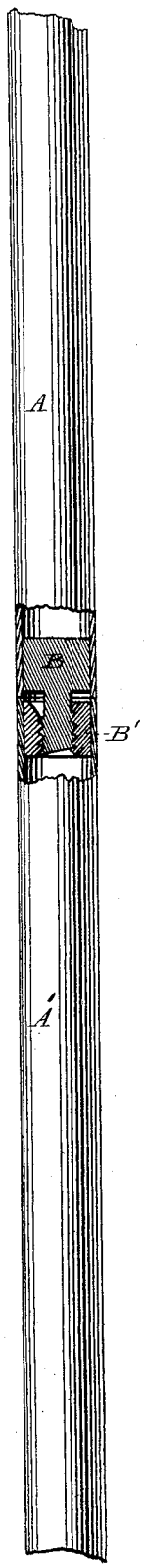
Figure 2:
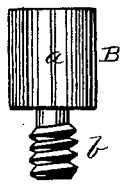
Figure 3:
Figure 4:
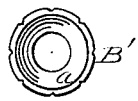

Figure 1 of the drawings is a representation of a sectional view of my coupling; and Figs. 2, 3, and 4 are detail views thereof.

This invention has relation to means for coupling the sections of lightning-rods; and it consists in the construction and novel arrangement of the screw thimbles or plugs, adapted to be secured to the ends of the sections by soldering. It also consists in the method of securing such screw-couplings by a filling of solder, whereby obstruction of the conduction by oxidation or mechanical opening of joints is, in a great measure, prevented, as hereinafter fully set forth.

In the ordinary methods of connecting lightning-rods, by pins and rivets, it is difficult to keep the conduction perfect. The joints are apt to part a little after the rivet is put in, and oxidation will be set up, causing obstruction. My soldered connection is rigid and solid, and does not in the least break the continuity of surface of the rod. The screw-connection brings the sections together with pressure.

In the accompanying drawings, the letters A A' designate the sections of a lightning-rod, which in the illustration are represented as hollow or tubular.

B designates the male screw plug or thimble. This consists of a solid body, *a*, and threaded extension *b*. If the rod is cylindrical, as illustrated in the drawings, the body *a* should be cylindrical and grooved, to hold as much solder as possible with due reference to the extent of circular bearing. In a similar manner the female screw-plug B' is constructed.

These plugs are to be soldered within the ends of the sections. A suitable flue being employed, each plug may be dipped in the melted solder and quickly placed in the tubular end of the section. The solder will set in a few moments, and the joint is secure. The lip of the wall of the rod-tube should extend a little beyond the face of the plug, as indicated in Fig. 1 of the drawings, so that when the sections are secured together the metal ends thereof will be brought in forcible contact. Oxidation will thus be prevented and conduction secured. If the rod be of any other form in cross-section the plugs may be made of similar shape. If the sections are solid the bodies *a* may be formed with flanges on their margins, and soldered on the exterior of the rod. In this latter case the thimbles should be made of copper.

I am aware that a screw-coupling the two parts of which are attached to the ends of the adjoining sections of a flanged rod by inserting the flanges into kerfs cut in the couplings, and binding the parts together by a wire wound in a groove around the coupling, and passing through notches in the flanges, and filling the interstices with solder, is not new; and I am also aware that it is not new, broadly, to connect together the sections of a lightning-rod by screw-couplings, and I therefore lay no claim to such inventions.

What I claim as new, and desire to secure by Letters Patent, is—

1. The lightning-rod section A, having the male plug B, with the solid grooved head *a* and screw-shank *b*, in combination with the section A', provided with the grooved female plug B', having a central screw-threaded perforation, the male and female plugs being inserted within or made to envelop the ends of said sections, and secured thereto by solder, substantially as described.

2. A connecting-plug having a grooved head, in combination with a hollow lightning-rod section, whereby the latter and the plug can be securely soldered together, substantially as described.

In testimony that I claim the above I have hereunto subscribed my name in the presence of two witnesses.

CHARLES H. SMITH.

Witnesses:
WALTER C. MASI,
GEORGE E. UPHAM.